B. FEINGOLD.
DISH DRIER.
APPLICATION FILED JUNE 19, 1919.

1,348,792.

Patented Aug. 3, 1920.

Inventor
BERNARD FEINGOLD
By his Attorney
Albert Bersin

UNITED STATES PATENT OFFICE.

BERNARD FEINGOLD, OF NEW YORK, N. Y.

DISH-DRIER.

1,348,792.    Specification of Letters Patent.    Patented Aug. 3, 1920.

Application filed June 19, 1919. Serial No. 305,217.

*To all whom it may concern:*

Be it known that I, BERNARD FEINGOLD, a citizen of the United States, and resident of New York, in the county of New York and State of New York, have invented certain new and useful Improvements in Dish-Driers, of which the following is a specification.

This invention relates to improvements in dish driers of the type in which the dishes are placed upon same and the water allowed to drip off. The object of this invention is to provide a dish drier or support which is efficient, convenient to use, sanitary, of simple construction and which does not require an additional basin to catch the water.

Figure 1:
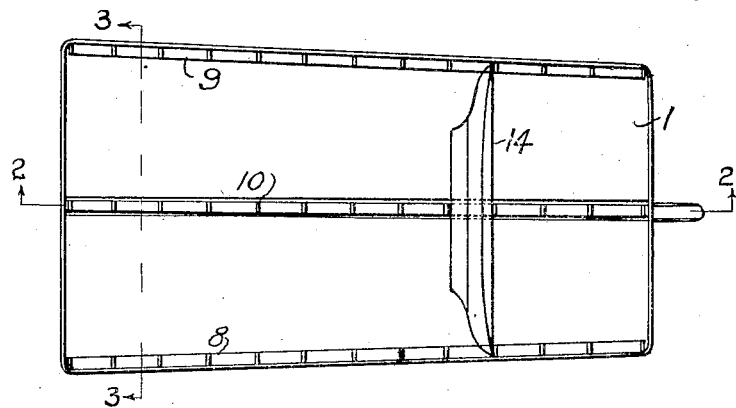
Figure 2:
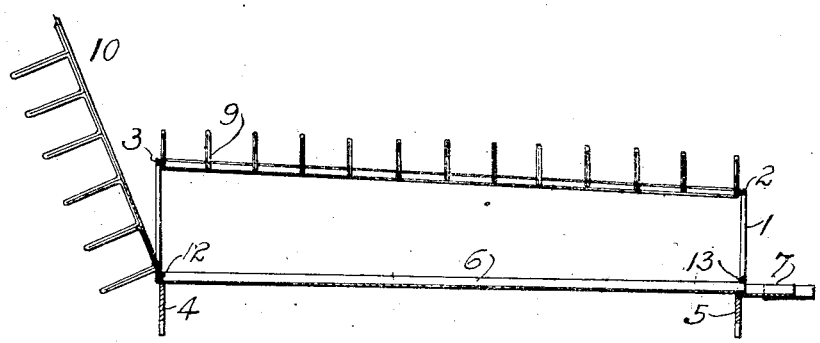
Figure 3:
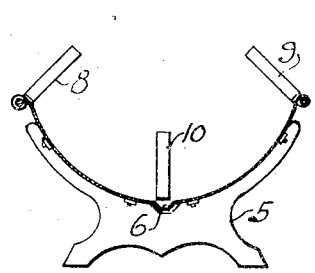
Figure 4:
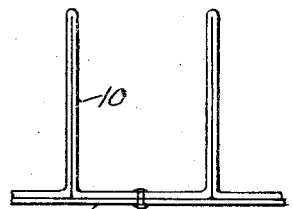

I obtain this object by means of the device fully described herein and illustrated in the accompanying drawing forming a part of this specification, and in which similar numerals refer to similar parts in all the views, and in which: Figure 1 is a plan view of my device; Fig. 2 is longitudinal section taken on line 2—2 of Fig. 1, with the center rung raised to show the drain; Fig. 3 is a cross section taken on line 3—3 of Fig. 1, and Fig. 4 is a large scale detail of a portion of the center rung.

Referring to the drawing, the supporting body consists of the pan 1 preferably made of sheet metal curved approximately semi-cylindrical in shape and the edges rolled over wires such as 2 or 3 which run all around the edges of the pan. The pan 1 is supported on the frames 4 and 5 and fixed thereto by means of bolts and nuts or rivets. The frame 4 is slightly higher than the frame 5 in order to provide a slope in the bottom of the pan 1 and thereby permit water reaching it to drain. The bottom of the pan 1 is shaped with a channel 6 to provide a space for the water to drip into and run off. At the end of the channel 6 an extending spout 7 is attached so that it can be extended over the sink into which the water may be allowed to drain. The rungs 8 and 9 preferably made of sheet metal and each one made of one piece of metal bent around consecutively as shown in detail in Fig. 4, are attached to the pan 1 by means of rivets or bolts. The center rung 10 is similar in construction to the rungs 8 and 9 except that the plate 11 is riveted to the bottom of it. It is held in position by being hingedly fixed to the wire 12 in the bottom of the pan and fits over the channel passage 6 at the bottom of the pan 1 permitting water to reach it. The other end of the rung 10 is adapted to slip under the wire 13 at the other end of the pan. The rung 10 is sufficiently elastic to permit its end to slip out from under the wire 13 by bending the former slightly, when it is desired to raise it, and thereby the channel passage may be cleaned. In order to accommodate different sizes of plates or dishes, the pan is preferably made wider at one end than the other and uniformly varying between.

In the use of the device, the plate 14 is held in an upright position between the rungs and is clearly shown in Fig. 1.

Having thus described my invention, I claim as new and wish to secure by Letters Patent:

A device of the character described comprising a pan having a channel passage at the bottom thereof, a series of rungs attached to sides of said pan and a series of rungs hingedly attached to said pan and adapted to fit over said channel passage.

Signed at Brooklyn, in the county of Kings, and State of New York, this 17th day of June, A. D. 1919.

BERNARD FEINGOLD.